Sept. 5, 1972   I. E. FIGGE ET AL   3,689,345

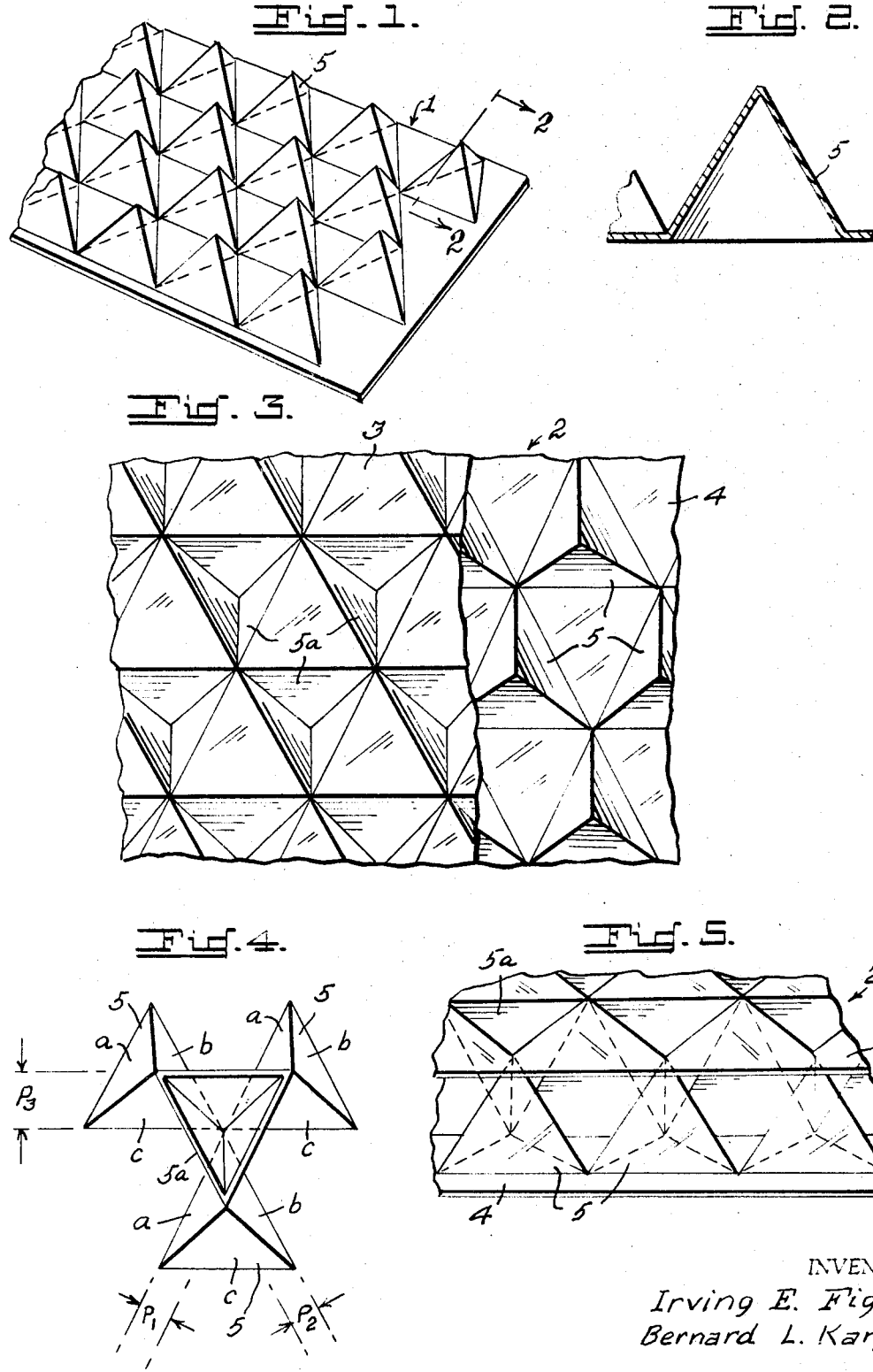

METHOD OF MAKING A QUASI-ISOTROPIC SANDWICH CORE

Filed May 20, 1970   2 Sheets-Sheet 2

INVENTORS,
Irving E. Figge
Bernard L. Karp
BY: Harry M. Saragovitz,
Edward J. Kelly &
Herbert Berl
Attorneys.

United States Patent Office 3,689,345
Patented Sept. 5, 1972

3,689,345
METHOD OF MAKING A QUASI-ISOTROPIC SANDWICH CORE
Irving E. Figge, Newport News, and Bernard L. Karp, Hampton, Va., assignors to the United States of America as represented by the Secretary of the Army
Filed May 20, 1970, Ser. No. 39,599
Int. Cl. B31f 1/08
U.S. Cl. 156—219                2 Claims

ABSTRACT OF THE DISCLOSURE

A structural core consisting of upper and lower sheets of a Fiberglas or like material. Each sheet defines parallel rows of raised, tetrahedronal shaped, hollow knobs. The upper sheet is inverted over the lower one so that the edges of the tetrahedrons abut whereby all tetrahedrons on the bottom sheet point up and all tetrahedrons on the upper sheet point down in alternating sequence along the rows. Each sheet is formed by placing it over a male mold having upstanding tetrahedron shaped raised knobs, folding the sheet between the tetrahedrons to produce puckers, applying bands in the fold lines to hold the sheet on the male mold, coating the sheet with an epoxy resin, cutting the bands and removing them, inverting a female mold over the male mold and applying pressure thereto, allowing the resin to cure, then removing the sheet from the molds. The core is then formed by coating all edges of the tetrahedrons on both sheets with a resin type bonding material, inverting the upper sheet and nesting it in the lower sheet so that the edges of the upper tetrahedrons abut the edges of the lower tetrahedrons and then bonded together, the core is then allowed to cure.

The invention described herein may be manufactured, used, and licensed by or for the Government for governmental purposes without the payment to us of any royalty thereon.

This invention relates to a constructional core of a honeycomb type and more particularly to a core having quasi-isotropic load carrying properties.

Constructional cores of the honeycomb type have many uses. One such use is in aircraft construction wherein the core must possess quasi-isotropic load carrying capabilities including tension, compression, bending, and torsional rigidity. Conventional cores usually consist of two sheets of material with the spacing means sandwiched between the sheets. These cores often lacked structural strength and it was hard to bond the elements together. Most commonly used cores of the honeycomb type were capable of carrying loads in only one direction, namely in a perpendicular direction to the face sheets.

The present invention is an improvement over the conventional type cores or panels and is made of but two pieces and lends itself to mass production due to the simplicity of its manufacture. The construction of the invention provides a panel that is capable of load carrying in all directions due to the novel arrangement of the tetrahedronal knobs which are bonded together at their edges.

It is therefore a principal object of this invention to provide a constructional panel that possesses quasi-isotropic properties including tension, compression, bending and torsional rigidity.

It is another object of this invention to provide a structural panel that is lightweight and formed of but two sheets of a moldable material.

A further object is to provide a constructional core of two moldable sheets having indrawn knobs of tetrahedronal shape, the tetrahedrons being bonded together along their edges.

A still further object is to provide a novel and improved method for the manufacture of a structural panel of two moldable sheets wherein each is indented to provide a series of tetrahedronal shaped knobs, one sheet being inverted and nested in the other sheet whereby the edges of the tetrahedrons abut and the edges being bonded together.

A final object is to provide a method of making a structural core which is lightweight, economical to manufacture and which possesses isotropic load carrying properties.

Other objects and advantages will be apparent from the following description and drawings in which:

FIG. 1 is a fragmentary perspective view of one of the sheets comprising the core;

FIG. 2 is a sectional detail view through one of the tetrahedrons and taken along line 3—3 of FIG. 1;

FIG. 3 is a fragmentary top view of a completed core, the upper sheet being broken away to expose the lower sheet;

FIG. 4 is a diagrammatic view showing a top tetrahedron nested between three bottom tetrahedrons;

FIG. 5 is a fragmentary perspective view of an edge of the completed core to illustrate positions of the upper and lower tetrahedrons;

Figure 6:
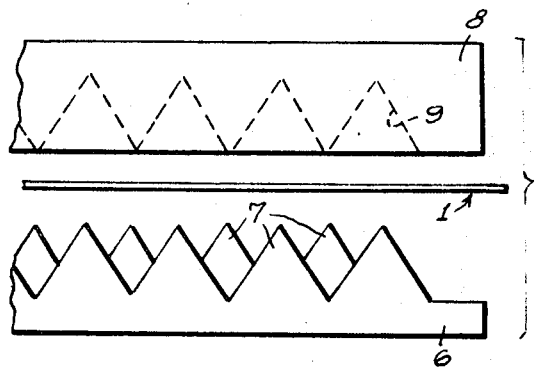
FIG. 6 is a fragmentary side view of the mold used in manufacturing the core.
Figure 8:
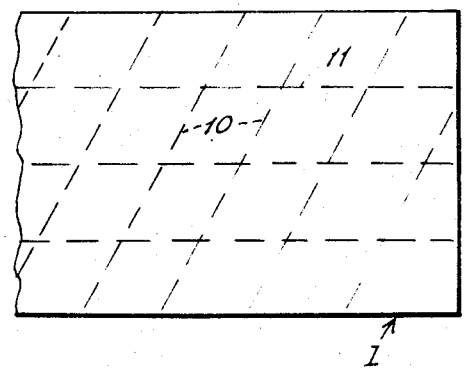
FIG. 8 is a plan view showing in dotted lines the manner of folding a sheet to produce puckers therein.

Referring in detail to the drawing wherein reference character 1 designates generally one of the sheets used in fabricating the core which is indicated generally by 2. Core 2 is composed of two identical sheets, the upper sheet being indicated by 3 while the lower sheet is indicated by 4. Sheets 3 and 4 are provided with series of upstanding, tetrahedronal shaped, hollow knobs 5 and 5a respectively. Knobs 5 and 5a are equal in dimensions and are arranged on sheets 3 and 4 in parallel rows, the knobs in one row being disposed on the sheet in offset relation with respect to the knobs of the adjacent rows whereby two sides of all of the tetrahedrons are disposed in oppositely inclining parallel planes while third sides are disposed in longitudinal parallel panes, all panes intersecting at the apices of their bases. This may readiy be observed by FIG. 4 in which three tetrahedrons 5 of lower sheet 4 and one tetrahedron 5a are shown diagrammatically. It will be observed that sides $a$ of tetrahedrons 5 lie in an inclining plane $P_1$, sides $b$ lying in oppositely inclining plane $P_2$ and sides $c$ in longitudial plane $P_3$ as shown. Planes $P_1$, $P_2$, $P_3$ intersect at $d$ as shown.

Upper sheet 3 is inverted and nested in lower sheet 4 and bonded thereto, so that the tetrahedrons 5a in the upper sheet 3 point downward, while the tetrahedrons 5 of the lower sheet 5 point upward whereby the edges of an upper tetrahedron will abut one of the edges of three lower tetrahedrons 5 as shown.

Sheets 3 and 4 may be of a suitable material as needed, such as Fiberglas, plastic, or even metal. The core 2 may be of any size as needed and a portion of a completed core is shown in FIGS. 3 and 5.

Figure 7:
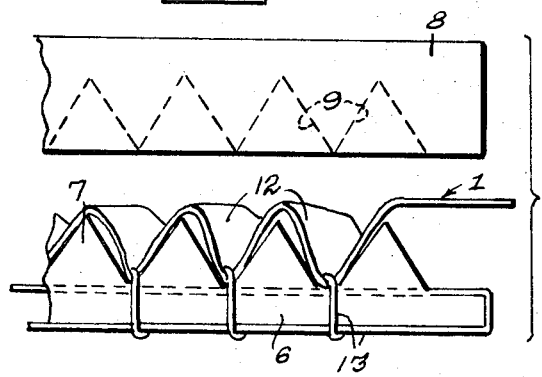
FIG. 7 is a similar view of the mold and showing a sheet secured to the male mold by rubber bands.
Figure 9:
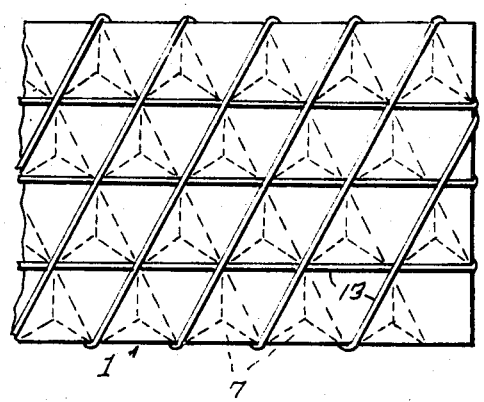
FIG. 9 is a similar view showing rubber bands in place to secure the sheet on the male mold, and, FIG. 10 is a fragmentary side view showing the mold closed and the rubber bands removed.
Figure 10:
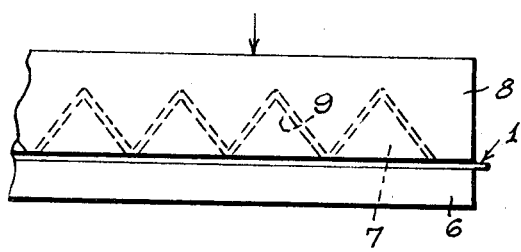

In FIGS. 6–10 is shown the method of forming one of the sheets 1. A molding apparatus of a suitable material is used and consists of a male mold 6 having upstanding tetrahedronal shaped knobs 7. The knobs are arranged on the mold 6 similar to a finished sheet 1 as seen in FIG. 9. A female mold 8 having tetrahedronal shaped recesses 9 therein comprises the other member of the mold apparatus. A sheet 1 is now placed over the male mold 6. Where the sheet material is composed of frangible material such as woven Fiberglas or thin layers of plastic or metal, it is necessary to preposition the material along the contours of one of the mold sections in order to prevent material rupture during the molding operation. In order to accomplish this prepositioning, the sheet folded along a series of longitudinal and diagonal lines such as lines 10 and 11 between the rows of tetrahedrons 7 on mold 6. This prepositioning produces puckers 12 as shown in FIG. 7. Holding bands 13 may be used to assist sheets that will not remain positioned on the mold by placing them on the fold lines 10 and 11 as seen in FIG. 9. The bands may be of any available material as they are removed and do not form part of the end product. Elastic bands have been found to be especially useful as they snap out when cut. Sheet 1 after being positioned is coated with a stiffening material such as an epoxy resin. The bands 13 are cut and removed and pressure is applied to the mold. The resin is allowed to cure and the sheet removed. Two sheets, 3 and 4 are fabricated in this manner. The edges of all tetrahedrons 5 and 5a are coated with an adhesive such as an epoxy resin and one sheet is inverted and nested in the other sheet so that the edges of the tetrahedrons abut, as best seen in FIG. 4. The core is now allowed to cure and removed from the mold. If the sheets are of a metal, welding the edges or other well known metal working procedures may be employed to join the sheets.

It is apparent from the foregoing that a unique, lightweight, high strength, easily fabricated sandwich constructional core has been provided and one which has quasi-isotropic load carrying capabilities including tension, compression, bending and torsional rigidity.

What is claimed is:
1. A method of forming a structural core from a pair of sheets of material having raised tetrahedrons thereon wherein the tetrahedrons abut each other and are in row alignment in one direction and diagonal alignment with respect to the first row alignment which comprises applying a bonding agent to the edges formed by intersecting faces of the tetrahedrons, reversingly nesting the sheets within each other to produce a core wherein said edges of each nested tetrahedron abut the edges of the several complementing nesting tetrahedrons and allowing the bonding agent to cure.
2. A method of forming a structural core in accordance with claim 1 wherein each of the sheets of material is formed by placing a flat sheet of flexible structural material over the male portion of a two-piece mold having the desired configuration, creasing the flat sheet along the longitudinal and diagonal lines of the mold and positioning it on the mold with the creased portions fitting between the rows of tetrahedrons on the mold, holding the material in position on the mold by placing removable holding bands over the sheet crease lines, closing the other cooperating portion of the two-piece mold over the positioned sheet, removing the holding bands and applying heat and pressure to the mold.

References Cited
UNITED STATES PATENTS 3,558,394   1/1971   Marby _____ 156—219 X
3,582,424   6/1971   Norvaisa _____ 156—219 X CARL D. QUARFORTH, Primary Examiner S. J. LECHERT, Jr., Assistant Examiner U.S. Cl. X.R.

156—245, 303.1; 161—68